UNITED STATES PATENT OFFICE.

AUGUST LEOPOLD LASKA AND ERNST JULIUS RATH, OF OFFENBACH-ON-THE-MAIN, GERMANY, ASSIGNORS TO CHEMISCHE-FABRIK GRIESHEIM-ELEKTRON, OF FRANK-FORT-ON-THE-MAIN, GERMANY, A CORPORATION.

VAT DYES OF THE ANTHRAQUINONE SERIES AND PROCESS OF MAKING SAME.

1,162,496.  Specification of Letters Patent.  Patented Nov. 30, 1915.

No Drawing.  Application filed January 25, 1915. Serial No. 4,390.

*To all whom it may concern:*

Be it known that we, AUGUST LEOPOLD LASKA and ERNST JULIUS RATH, citizens of the German Empire, and resident of Offenbach-on-the-Main, in the Grand Duchy of Hesse, Germany, have invented new and useful Improvements in Vat Dyes of the Anthraquinone Series and Processes of Making Same, of which the following is a specification.

Our invention relates to the production of vat dyes of the anthraquinone series. These dyes are formed by condensation of o-aminoazo dyestuffs with anthraquinone-aldehydes and according to the nomenclature of Richter (*Chemie der Kohlenstoff-verbindungen*, XI. edition, Vol. II, page 974) are regarded as derivatives of c-anthraquinonyl-α-dihydrotriazin containing the triazin-ring at least once.

The following examples illustrate the invention, the parts being by weight:

Example I: 50 parts benzol-azo-β-naphthylamin are dissolved in 500 parts of glacial acetic acid by heating and a solution of 50 parts 2-anthraquinone-aldehyde in 500 parts of glacial acetic acid is added. The condensation product of the formula:

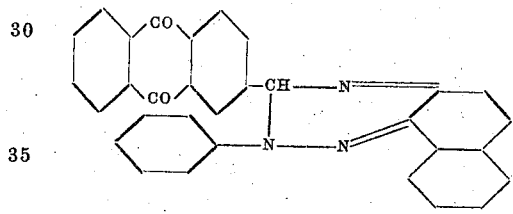

naphtho-n-phenyl-c-β-anthraquinonyl-α-dihydrotriazin is immediately precipitated in form of a bright yellow sediment: it is filtered off, washed out by acetic acid and water and dried. The yield is quantitative. The dyestuff forms a yellow crystal powder, dissolves in concentrated sulfuric acid with brown color and dyes cotton in the alkaline hydrosulfite vat fast yellow tints.

Example II: 75 parts of the o-aminoazo dyestuff, obtained by combination of α-diazoanthraquinone with β-naphthylamin, are dissolved in 750 parts nitrobenzene by heating and a solution of 50 parts 2-anthraquinone-aldehyde in 500 parts of glacial acetic acid is added. After short boiling the reaction is completed, the condensation product of the formula:

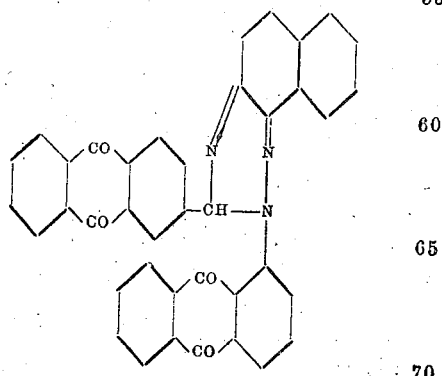

crystallizes off by cooling in orange needles. The dyestuff dissolves with red color in concentrated sulfuric acid; it gives with alkaline hydrosulfite solution a brownish red vat, dyeing cotton clear reddish yellow tints.

Example III: 75 parts of the o-aminoazo dyestuff, obtained by combination of β-diazoanthraquinone with β-naphthylamin are condensed with 50 parts 2-anthraquinone-aldehyde as indicated in Example II. The dyestuff crystallizes in orange red needles, dissolves with red color in concentrated sulfuric acid and gives with alkaline hydrosulfite solution a reddish brown vat dyeing cotton bright orange tints of eminent fastness.

The reaction may be indicated as follows:

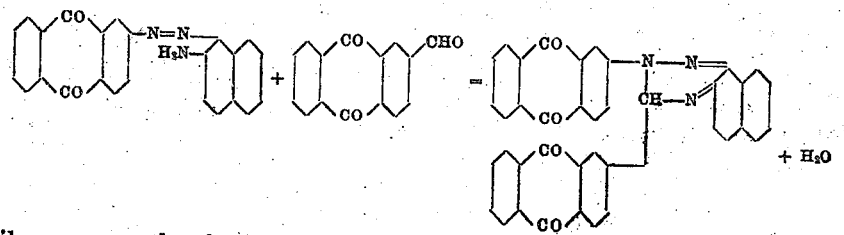

In like manner the formation of dyestuff can be executed by 1-anthraquinone-aldehyde. In the place of aldehydes their substitution products may be used for condensation. In the same manner instead of the described other o-aminoazo dyes can be taken and instead of monoazo dyes disazo dyes. As disazo dyestuffs these may be considered which are obtained by the tetrazo compounds from 1.5- and 2.6-diaminoanthraquinone; bases of the diphenyl series, diaminocarbazol, 1.5-diaminonaphthalin and their analogues.

Now what we claim and desire to secure by Letters Patent is the following:

1. Process of making vat dyes of the anthraquinone series by condensing o-aminoazo dyestuffs with anthraquinone-aldehydes.

2. As new products the vat dyes which can be obtained by condensation of o-aminoazo dyestuffs with anthraquinone-aldehydes, forming yellow, red and brown powders; their vats dyeing cotton yellow orange, reddish and brown tints.

That we claim the foregoing as our invention, we have signed our names in presence of two witnesses, this seventh day of January 1915.

AUGUST LEOPOLD LASKA.
ERNST JULIUS RATH.

Witnesses:
PETER LAUTENSCHLÄGER,
FRITZ DÉSOR.